(12) United States Patent
Nakajima

(10) Patent No.: US 7,088,991 B2
(45) Date of Patent: Aug. 8, 2006

(54) PORTABLE TELEPHONE SYSTEM

(75) Inventor: Taketoshi Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 520 days.

(21) Appl. No.: 10/062,709

(22) Filed: Feb. 5, 2002

(65) Prior Publication Data

US 2002/0107004 A1    Aug. 8, 2002

(30) Foreign Application Priority Data

Feb. 6, 2001  (JP) .............................. 2001-029221

(51) Int. Cl.
*H04M 1/65* (2006.01)
*H04M 1/57* (2006.01)

(52) U.S. Cl. .................. 455/412.1; 379/68; 379/93.35; 379/215.01; 379/373.01; 455/414.1; 455/415; 455/550.1; 455/567

(58) Field of Classification Search ................. 455/415, 455/555, 414, 414.1, 567; 379/215
See application file for complete search history.

(56) References Cited

U.S. PATENT DOCUMENTS

| | | | | |
|---|---|---|---|---|
| 5,894,504 A | * | 4/1999 | Alfred et al. | ............. 379/88.13 |
| 5,946,386 A | * | 8/1999 | Rogers et al. | ......... 379/265.09 |
| 5,974,131 A | * | 10/1999 | Malik | ................... 379/215.01 |
| 6,018,671 A | * | 1/2000 | Bremer | ....................... 455/567 |
| 6,070,068 A | * | 5/2000 | Sudo | ........................ 455/414.1 |
| 6,141,560 A | * | 10/2000 | Gillig et al. | .............. 455/553.1 |
| 6,253,075 B1 | * | 6/2001 | Beghtol et al. | .............. 455/415 |
| 6,591,115 B1 | * | 7/2003 | Chow et al. | ................. 455/555 |
| 6,654,603 B1 | * | 11/2003 | Chow et al. | .............. 455/414.1 |
| 2002/0077089 A1 | * | 6/2002 | Contreras | .................... 455/415 |
| 2003/0138080 A1 | * | 7/2003 | Nelson et al. | ........... 379/88.16 |

FOREIGN PATENT DOCUMENTS

| | | |
|---|---|---|
| JP | 9-139978 | 5/1997 |
| JP | 10-200962 | 7/1998 |
| JP | 11-150602 | 6/1999 |
| JP | 3082845 | 6/2000 |
| JP | 2000-224340 | 8/2000 |

* cited by examiner

*Primary Examiner*—Fan Tsang
*Assistant Examiner*—Lisa Hashem
(74) *Attorney, Agent, or Firm*—McGinn IP Law Group, PLLC

(57) ABSTRACT

A portable telephone terminal 1 has a built-in memory 18, in which either the content of a new call arrived is recorded while continuing prevailing communication or recording of the content of the prevailing communication call is started while answering the new call. After the end of the communication, reproduction of the record in the built-in memory 18 in the portable telephone terminal 1 is made possible immediately or at an appropriate time.

15 Claims, 4 Drawing Sheets

PORTABLE TELEPHONE SYSTEM

BACKGROUND OF THE INVENTION

This application claims benefit of Japanese Patent Application No. 2001-029221 filed on Feb. 6, 2001, the contents of which are incorporated by the reference.

The present invention relates to portable telephone communication method and system and, more particularly, to portable telephone communication method and system capable of coping with a plurality of arrived calls at a time.

Portable telephone systems have been rapidly spread owing to their convenience merits, and the number of their sets having been spread is now exceeding the number of installed telephone sets or terminals. Also, the performance of portable telephone systems are becoming higher and higher, and portable telephone sets having new functions which are not provided in the installation type telephone sets have been developed. Prior art concerning installation type telephone sets is disclosed in, for instance, Japanese Patent Laid-Open No. 2000-224340 entitled "Portable Telephone Set with Recording Function" (hereinafter referred to as first prior art), Japanese Patent Laid-Open No. 9-139978 entitled "Voice Signal Transmitting and Receiving System" (hereinafter referred to as second prior art), Japanese Patent Laid-Open No. 10-200962 entitled "Multiple-Call Communication System: (hereinafter referred to as third prior art), Japanese Patent Laid-Open No. 11-150602 entitled "Radio Telephone System" (hereinafter referred to as fourth prior art) and Japanese Patent Laid-Open No. 11-177678 entitled "Message Recording and Reproducing System" (hereinafter referred to as fifth prior art).

The above first prior art concerns portable telephone sets with recording function, in which up and down voices can be sorted out for recording in an external recorder. The second prior art concerns portable telephone sets with recording function capable of hearing not only voice from the opposite side but also recorded voice during communication. The third prior art concerns systems, in which a time division multiplex communication path is established between a base station controller and a plurality of mobile terminals, whereby multiple call communication can be executed via a single mobile terminal. The fourth prior art concerns a radio telephone system, in which each mobile terminal can be simplified for connection with less incomprehensible channels when adding a voice recording function, and the user himself or herself can appropriately select the voice quality or the recording time by compressing the voice data and increasing the voice recording time when preserving more voice data. The fifth prior art concerns a message recording and reproducing system, in which the reproduction of messages having been sent out from recorded callers can be processed for each caller.

As shown above, the spread of the portable telephone, leads to increased occasions of communication between portable telephone sets or from other telephone sets and thus frequent cases of arrival of a new call during communication with a portable telephone set. In such cases of arrived call overlap, it has been inevitable to select either refusing the new call or answering the new call by interrupting the communication of the prevailing call. This means that such operations as interruption of communication and data transfer become necessary with respect to either one of the opposite side users, thus extremely spoiling the convenience of the portable telephone system.

SUMMARY OF THE INVENTION

An object of the present invention is to provide portable or telephone communication system and method capable of maintaining the convenience of both users in the case of arrival of a new call during communication.

According to an aspect of the present invention, there is provided a portable telephone communication method in the case of arrival of a new call during communication with an opposite side portable telephone terminal or telephone terminal via a base station, wherein: a check is executed during communication as to whether any new call has arrived, and when a new arrival call is detected, recording of the content of either the new arrival call or the prevailing communication call is executed.

The content of the call to be recorded is selectable by the user of the own portable telephone terminal. A message is sent out beforehand with respect to the call content to be recorded.

According to another aspect of the present invention, there is provided a portable telephone communication terminal capable of communicating with an opposite side portable telephone terminal or telephone terminal via a base station, wherein: the portable telephone communication terminal comprises a control section for detecting a new call arrived during communication, and a memory for recording signal, the control section being operative, upon detection of a new call, to select one of the two calls and execute recording of the content of the selected call.

After the end of the communication the control section executes reproducing the content recorded in the memory. The memory is a semiconductor memory. A message of recording is sent out to the user, the call content of which is to be recorded.

According to other aspect of the present invention, there is provided a telephone communication system executing: during communication of a first telephone terminal with a second telephone terminal upon receipt of a new call from a third telephone terminal, establishing two radio communication channels, storing in a memory one of the communication information with the second telephone terminal and the information from the third telephone terminal, and reading out for reproducing the information stored in the memory.

One of the communication information with the second telephone terminal and the information from the third telephone terminal to be stored in the memory is selectable by the first telephone terminal. Upon end of the communication, the information stored in the memory is automatically read out and reproduced. A message about the recording the information is informed to the second telephone terminal or third telephone terminal.

Other objects and features will be clarified from the following description with reference to attached drawings.

PREFERRED EMBODIMENTS OF THE INVENTION

Preferred embodiments of the present invention will now be described with reference to the drawings.

Figure 1:
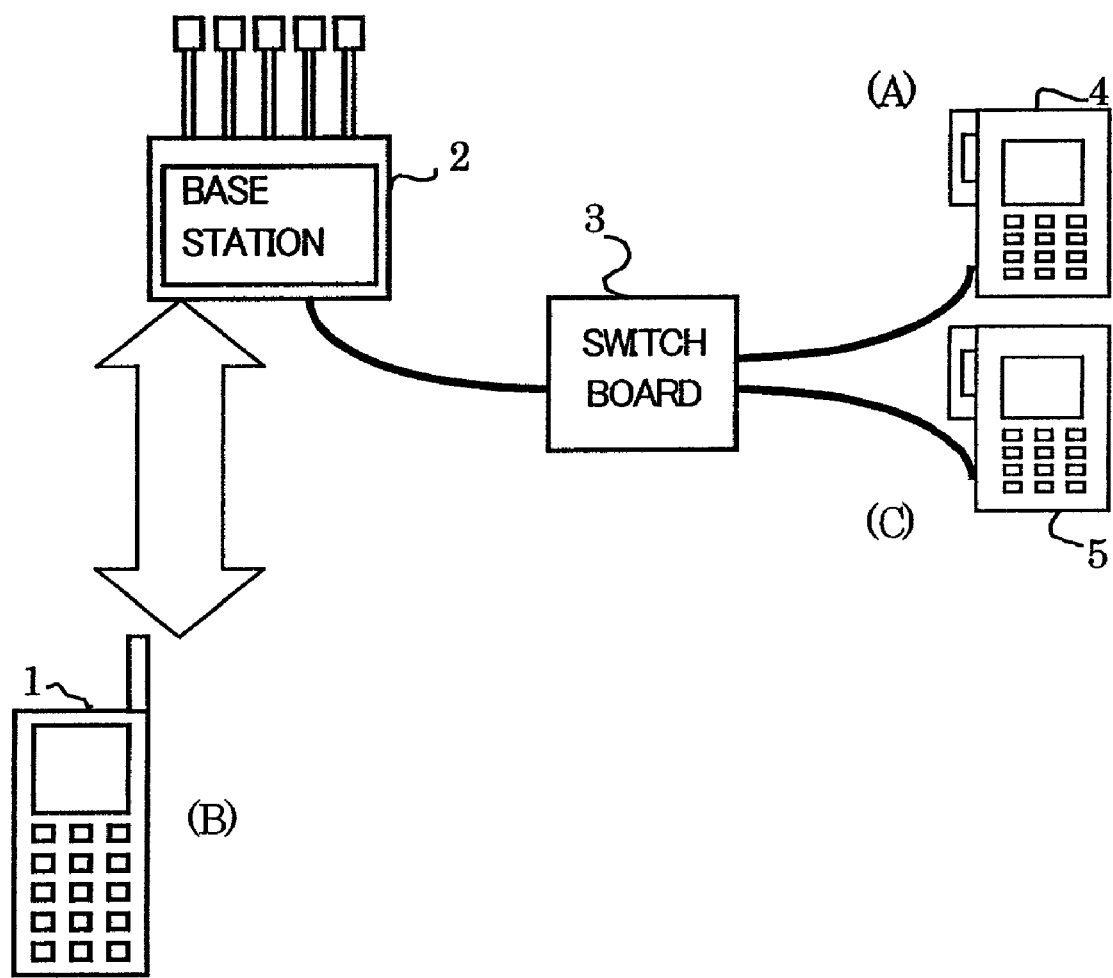
FIG. 1 is a view showing the entire system constitution of a preferred embodiment of the portable telephone system according to the present invention.

FIG. 1 is a view showing the entire system constitution of a preferred embodiment of the portable telephone system according to the present invention. The illustrated system comprises a portable telephone set (or portable telephone terminal) 1, a base station 2, a switchboard 3 and a plurality of telephone terminals (or telephone terminals) 4 and 5. The telephone sets 4 and 5 are coupled by wire to the switchboard 3 and, through the switchboard, to the base station 2. The base station 2 is coupled by radio to the portable terminal 1 for communication therewith.

In the prior art portable telephone system, at the time of a new call arrival during communication with a telephone set, it has been inevitable either to refuse the new call or to answer the new call by interrupting the prevailing communication. With the interruption brought about with respect to either one of the opposite side users, the convenience is extremely impeded. According to the present invention, the content of the interrupted call or the new arrival call (or second call) is recorded in a recording means (or memory) in the portable telephone set 1, thereby alleviating the above inconvenience. The portable telephone set according to the present invention is applicable to a portable telephone terminal of such system as PDC (Personal Digital Cellular) system, PHS (Personal Handyphone System), GSM (Global System for Mobile Communication) and UMTS, which has a channel capacity of simultaneous transmission of two or more calls but has only a single receiver.

Referring to FIG. 1, the portable telephone terminal 1 is one with the present invention applied thereto and, as noted above, is coupled by radio to the base station 2, which is in turn coupled by wire to the switchboard 3. The switchboard 3 can switch a plurality of calls. The telephone terminals 4 and 5 are either portable or installed (i.e., stationary) telephone sets. In a specific example, it is assumed that the portable telephone terminal 1 is in communication with the telephone terminal 4 and that during this communication the telephone terminal 5 produces a call (i.e., telephone call) to the portable telephone terminal 1.

Figure 2:
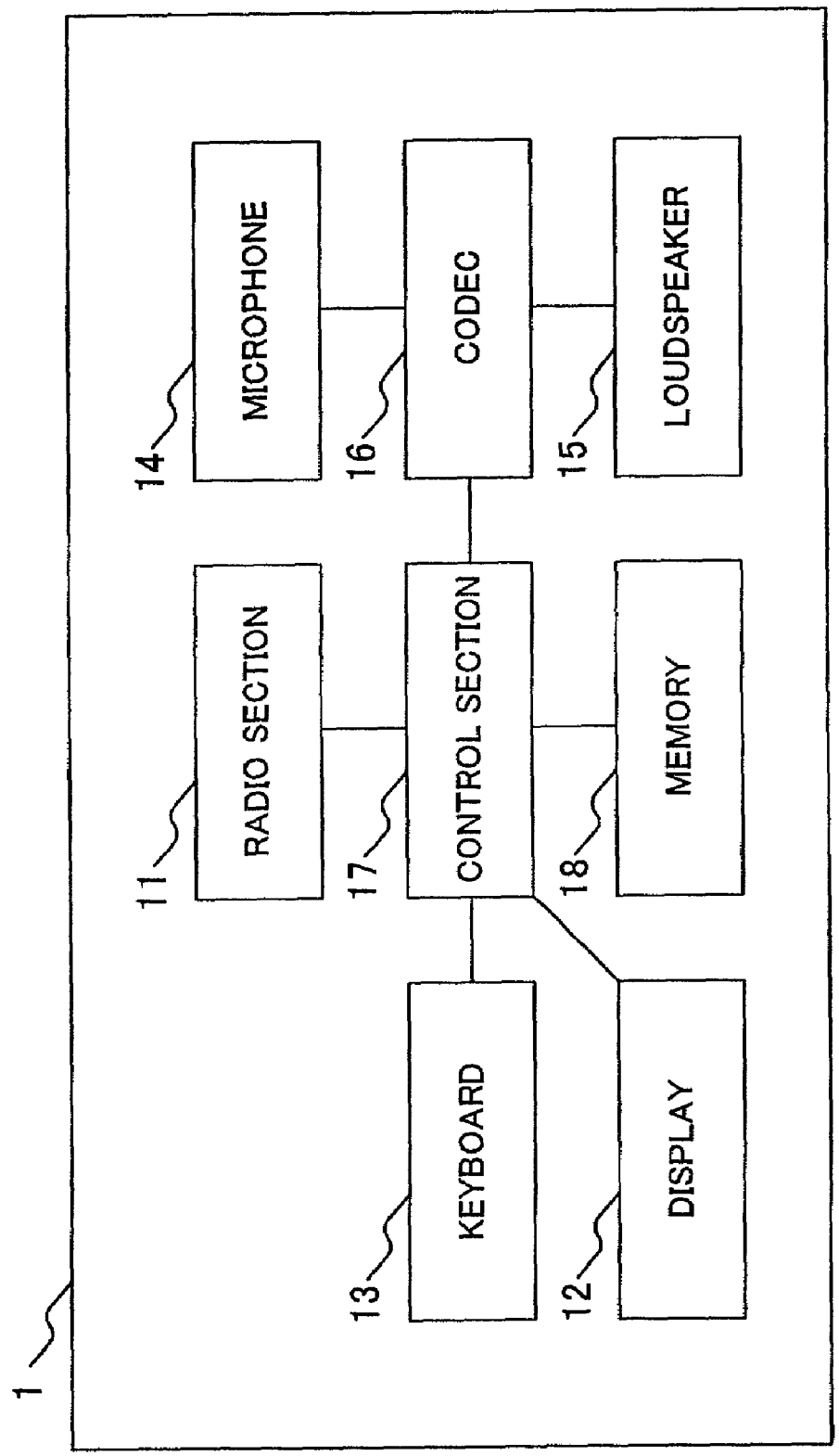
FIG. 2 is a block diagram showing the construction of the portable telephone terminal 1 in the preferred embodiment of the portable telephone system according to the present invention.

FIG. 2 is a block diagram showing the construction of the portable telephone terminal 1 in the preferred embodiment of the portable telephone system according to the present invention. The portable telephone system or portable telephone terminal 1 according to the present invention comprises a radio section 11, a display 12, a keyboard 13, a microphone 14, a loudspeaker 15, a CODEC (coder/decoder) 16, a control section 17 and a memory (or recording means) 18. The control section 11 executes the radio communication with the base station 2. The display 12 is an LCD (liquid crystal display panel) or like display means for displaying data for the user. The keyboard 13 is an inputting means for inputting data by the user. The microphone 14 takes user's voice in the portable telephone terminal 1. The loudspeaker 15 is an electric-to-acoustic transducing means permitting the user to hear voice from the opposite side. The CODEC 16 executes a coding/decoding process with respect to the voice handled in the microphone 14 and the loudspeaker 15. The control section 17 controls the entirety of the portable telephone terminal 1. The memory 18 is a recording means for storing the data used in the control section 11 and also voice records.

For the description of the preferred embodiment shown in FIGS. 1 and 2 according to the present invention, the telephone terminal 4 is labeled A, the portable telephone terminal 1 is labeled B, the telephone set 5 is labeled C, and the following definitions are used.

(A-B): Call (from telephone terminal 4) of communication with the portable telephone terminal 1.

(B-C): Call (form telephone terminal 5) arrived at the portable telephone terminal 1 during the above communication.

Figure 3:
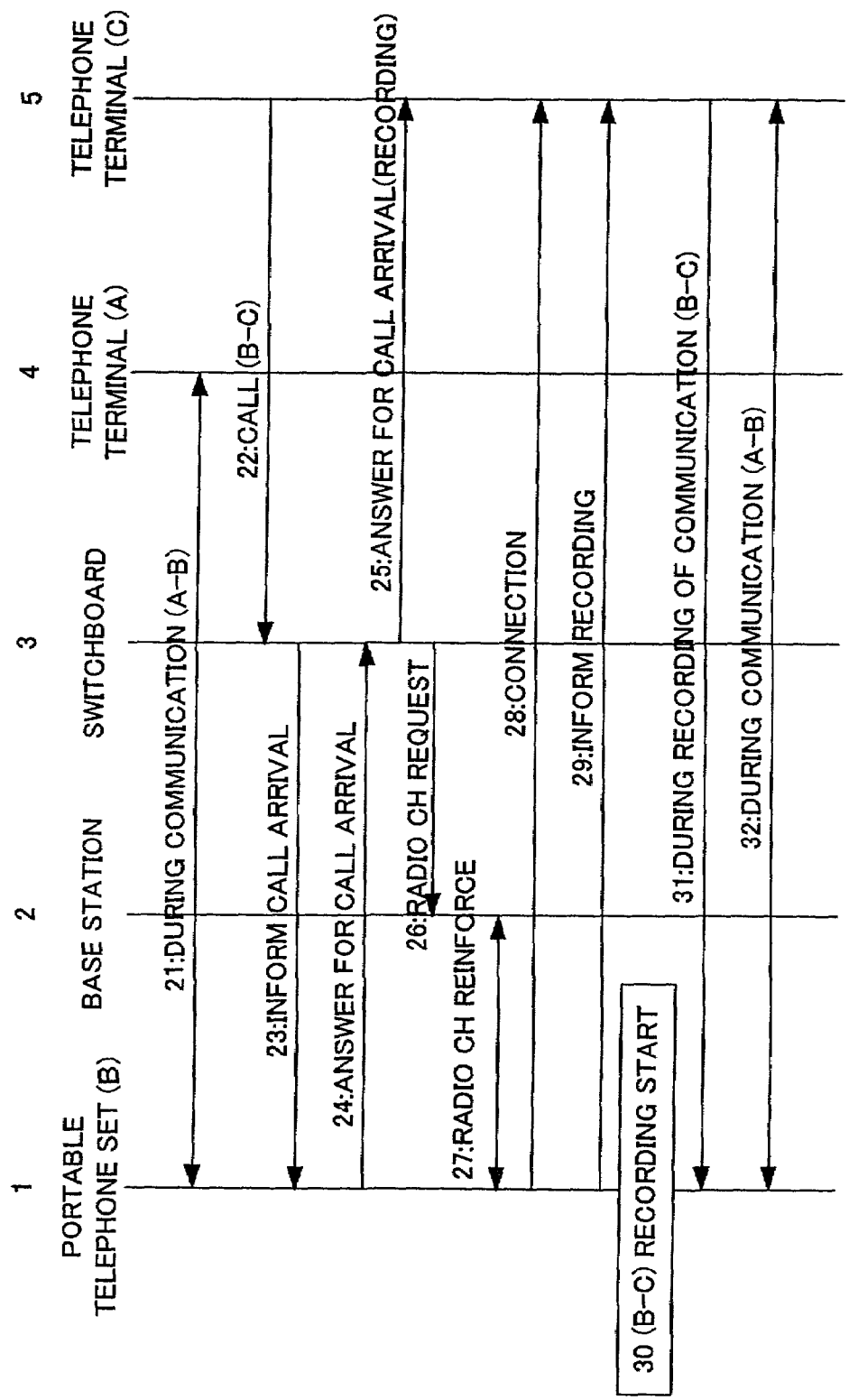
FIG. 3 is a sequence diagram of the operation of the portable telephone system shown in FIG. 2.

The operation of the portable telephone system According to the present invention will now be described with reference to the sequence diagram of FIG. 3. This sequence is followed in a case, in which the prevailing (A-B) call communication is continued with respect to the arrival of the (B-C) call, while recording the content of the (B-C) call in the portable telephone terminal 1. It is assumed that the portable telephone terminal 1 is in communication with the telephone terminal 4 (step 21). During the communication, the telephone terminal 5 sends out a call (i.e., telephone call) to the portable telephone terminal 1, and the data of the call is delivered to the switchboard 3 (step 22). The switchboard 3 informs by using a control radio CH (channel) to the portable telephone terminal 1 that a call has arrived thereat (step 23). When the user of the portable telephone terminal 1 decides to record the arrival call content, he or she informs to the switchboard 3 that he or she has answered (responded to) the arrival call (step 24). The switchboard 3 informs to the user of the telephone terminal 5 that the portable terminal 1 has answered the arrival call (step 25), and at the same time requests the use of communication radio to the base station 2 (step 26).

The base station 2 reinforces the radio CH between it and the portable telephone set 1 to an extent corresponding to double the radio CH (step 27). For example, in the case of the PDC/GMS or the like, two half-rate voice CHs are used in full-rate radio CH. In the case of the PHS, two 32-kbps voice CHs are used in 64-kbps radio CH. In the case of a CDMA system such as UMTS(W-CDMA) system, flexible or variable transfer capacity is used.

After the updating of the radio CH (step 27), the portable telephone terminal 1 informs to the telephone terminal 5 that it has been coupled thereto (step 28). At the same time, the portable telephone terminal 1 informs to the telephone terminal 5 a message that it will record the (B-C) call content (step 29). After this informing, the portable telephone terminal 1 does not deliver the voice data of the (B-C) call to the loudspeaker 15, but it starts direct recording of the voice data in the memory 18 (step 30). As a result, a recording state is set up with respect to the (B-C) call (step 31), and a communication state is set up with respect to the (A-B) call (step 32). In this way, communication and recording can be executed simultaneously. The user of the portable telephone terminal 1 can reproduce once recorded voice through the loudspeaker 15 at any time, and it is preferable to start reproduction of the recorded voice as soon as the communication is ended.

Figure 4:
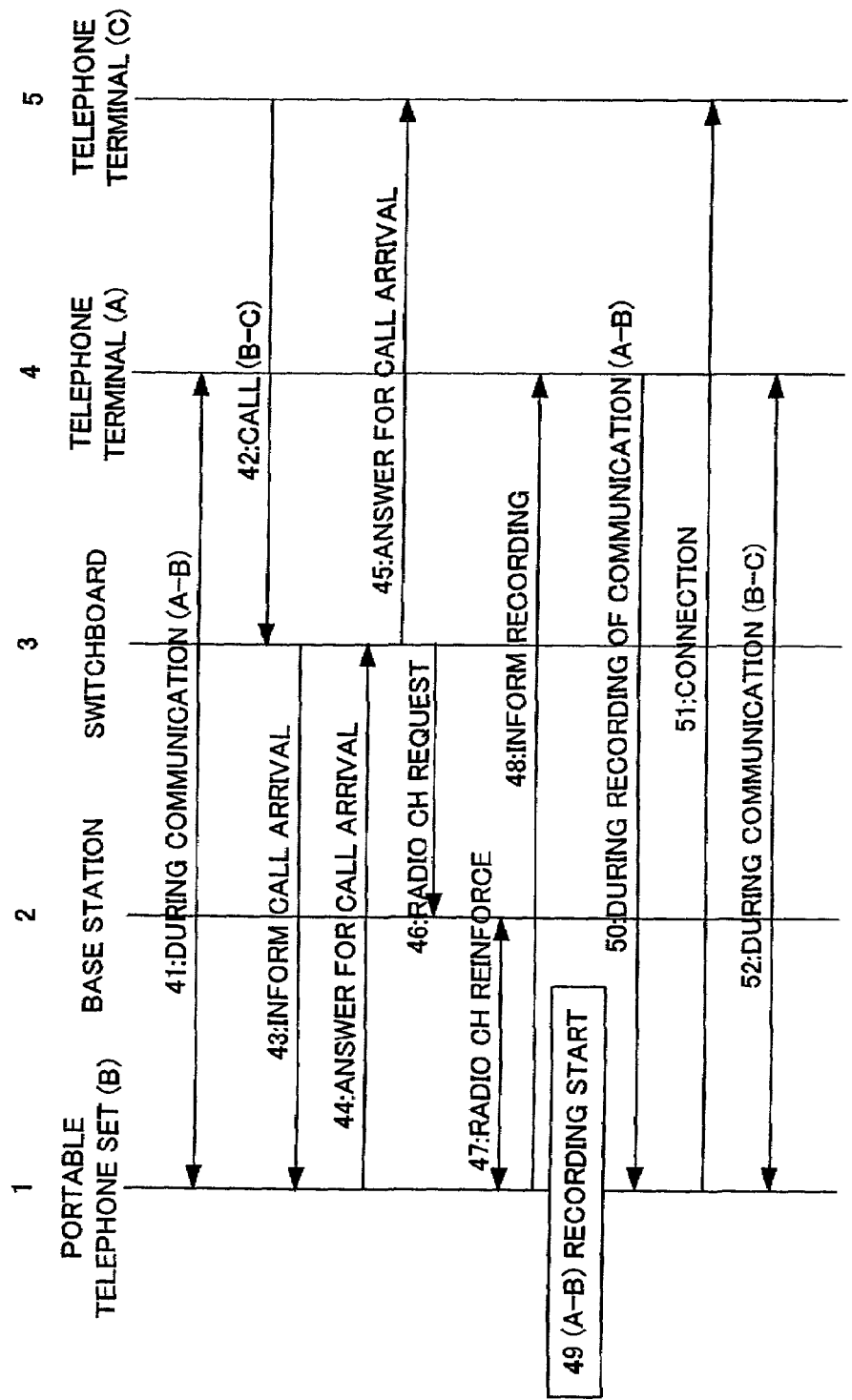
FIG. 4 is another sequence diagram of the operation of the portable telephone system shown in FIG. 2.

A different embodiment of the present invention will now be described with reference to the sequence diagram of FIG. 4. This sequence is followed in a case, in which upon arrival of the (B-C) call recording of the prevailing (A-B) communication in the portable telephone terminal 1 and the (B-C) call communication are started. It is assumed that the portable telephone terminal 1 is in communication with the telephone terminal 4 (step 4). During this time, the telephone terminal 5 produces a call (i.e., telephone call) to the portable telephone terminal 1, and the call data is delivered to the switchboard 3 (step 42). The switchboard 3 informs by using the control radio CH to the portable telephone terminal (B)1 that the call has arrived thereat (step 43). When the user of the portable telephone terminal 1 answers the arrival call and decides to start recording of the prevailing (A-B) call content, he or she informs to the switchboard 3 that he or she has answered the call (step 44). The switchboard 3 informs to the user of the telephone terminal 5 that the call has been answered (step 45) and requires the radio communication channel to the base station 2. The base station 2 reinforces the radio CH between it and the portable telephone terminal 1 to an extent corresponding to double the CH (step 47).

After the updating of the radio CH in the step 47, the portable telephone set 1 informs to the telephone terminal 4 a message that recording of the (A-B) call will be executed (step 48). After this informing, the recording of the content of the (A-B) call is started (step 49), a state of recording the (A-B) call content is set up (step 50). The (B-C) call is coupled to the CODEC 16 (step 51). A (B-C) call communication state is thus set up (step 52). After the end of the communication, the record is automatically reproduced. If any call under recording remains after the end of the communication, it is answered. During recording, the up radio CH is unnecessary, and it is thus automatically turned off.

As has been described in the foregoing, the portable telephone communication method and system according to the present invention, permit obtaining the pronounced practical effects. When a new call arrives during communication, it is possible to leave a message in the portable telephone terminal by recording the new call. It is thus possible to improve the convenience of the caller. In addition, unlike the system in which messages or the like are accumulated in the center, the user of the portable telephone terminal can hear the recorded message right after the communication. This means that freedom from charging of fees for the use of the center or fees of communication that may otherwise be charged for each inquiring, is guaranteed. Moreover, it is possible to reproduce the record outside the communication zone of the portable telephone set as well and also even at the time of the telephone CH congestion.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable telephone communication method, comprising:
    conducting a first communication between a first opposite side telephone terminal and a portable telephone terminal via a base station;
    during the first communication determining that a second communication has been placed via the base station to the portable telephone terminal from a second opposite side telephone terminal;
    in response to the placing of the second communication, indicating to the portable telephone terminal that the second communication has been placed;
    at the portable telephone terminal, selecting whether to record the first communication or the second communication; and
    at the portable telephone terminal, recording the selected communication and conducting the other communication.

2. The portable telephone communication method according to claim 1, further comprising sending a message to the opposite side telephone terminal whose communication is to be recorded informing of the recording.

3. The portable telephone communication method according to claim 1, further comprising, following completion of conducting of said other communication, reproducing the recorded selected communication.

4. A portable telephone communication terminal for communicating via a base station with an opposite side telephone terminal, said portable telephone communication terminal comprising telephone components enabling placing, receiving and conducting of telephone communications; a memory; and a control section, wherein said control section is adapted for:
    connecting a first communication between a first opposite side telephone terminal and the portable telephone terminal via the base station;
    during the first communication, determining that a second communication has been placed via the base station to the portable telephone terminal from a second opposite side telephone terminal;
    in response to the placing of the second communication, indicating to the portable telephone terminal that the second communication has been placed;
    selecting whether to record the first communication or the second communication; and
    recording the selected communication in said memory and conducting the other communication with said telephone components.

5. The portable telephone communication terminal according to claim 4, wherein:
    after ending of said other communication, said control section causes reproducing of the communication recorded in said memory.

6. The portable telephone communication terminal according to claim 4, wherein said memory comprises a semiconductor memory.

7. The portable telephone communication terminal according to claim 4, wherein said control section is further adapted for causing a message informing of the recording to be sent to the opposite side telephone terminal the communication of which is to be recorded in said memory.

8. The portable telephone communication terminal according to claim 4, wherein said control section is further adapted for reproducing the selected communication from said memory following completion of conducting of said other communication.

9. A telephone communication system for communicating with an opposite side telephone terminal, said telephone communication system comprising a base station; and a portable telephone terminal having telephone components enabling placing, receiving and conducting of telephone communications, a memory, and a control section, wherein said control section is adapted for:
    establishing a first radio communication channel between said portable telephone terminal and said base station;
    connecting a first communication between a first opposite side telephone terminal and the portable telephone terminal via the base station and the first radio communication channel;

during the first communication determining that a second communication has been placed via the base station to the portable telephone terminal from a second opposite side telephone terminal;

in response to the placing of the second communication, indicating to the portable telephone terminal that the second communication has been placed;

selecting whether to record the first communication or the second communication; and recording the selected communication in said memory and conducting the other communication with said telephone components.

10. The telephone communication system according to claim 9, wherein upon the end of said other communication, the communication stored in said memory is automatically read out and reproduced.

11. The telephone communication system according to claim 9, wherein said controller is further adapted for causing a message informing of the recording to be sent to the opposite side telephone terminal the communication of which is to be recorded in said memory.

12. The telephone communication system according to claim 9, wherein said control section is further adapted for reproducing the selected communication from said memory following completion of conducting of said other communication.

13. A radio telephone communication method, comprising:

conducting a first communication between a first opposite side telephone terminal and a host telephone terminal;

during the first communication determining that a second communication has been placed to the host telephone terminal from a second opposite side telephone terminal;

in response to the placing of the second communication, indicating to the host telephone terminal that the second communication has been placed;

at the host telephone terminal, selecting whether to record the first communication or the second communication;

at the host telephone terminal, recording the selected communication and conducting the other communication.

14. A host telephone terminal for communicating with an opposite side telephone terminal, said host telephone terminal comprising telephone components enabling placing, receiving and conducting of telephone communications; a memory; and a control section, wherein said control section is adapted for:

conducting a first radio communication between a first opposite side telephone terminal and the host telephone terminal;

during the first communication determining that a second communication has been placed to the host telephone terminal from a second opposite side telephone terminal;

in response to the placing of the second communication, indicating to the host telephone terminal that the second communication has been placed;

at the host telephone terminal, selecting whether to record the first communication or the second communication; and at the host telephone terminal, recording the selected communication in said memory and conducting the other communication with said telephone components.

15. A telephone communication system for communicating with an opposite side telephone terminal, said telephone communication system comprising:

portable communication means; and means for relaying telephone communications to said portable communication means, wherein said portable communication means includes operating means enabling placing, receiving and conducting of telephone communications, storage means, and control means, and said control means is adapted for:

establishing a first radio communication channel between said portable communication means and said means for relaying telephone communications;

connecting a first communication between a first opposite side telephone terminal and the portable communication means via the means for relaying telephone communications and the first radio communication channel;

during the first communication determining that a second communication has been placed via the means for relaying telephone communications to the portable communication means from a second opposite side telephone terminal;

in response to the placing of the second communication, establishing a second radio communication channel between said portable communication means and said means for relaying telephone communications;

selecting whether to record the first communication or the second communication; and recording the selected communication in said storage means and conducting the other communication with said operating means.

* * * * *